Patented Oct. 23, 1923.

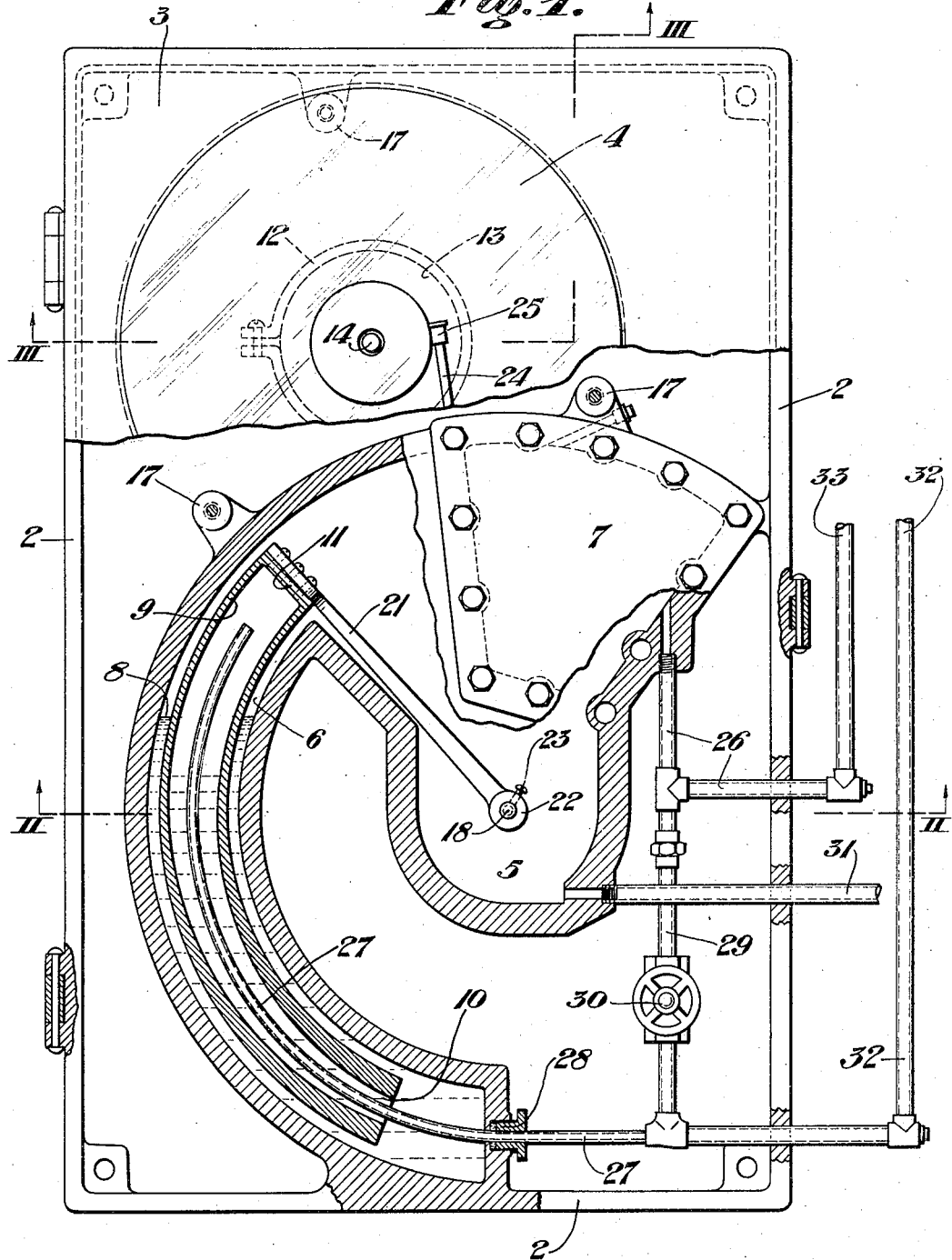

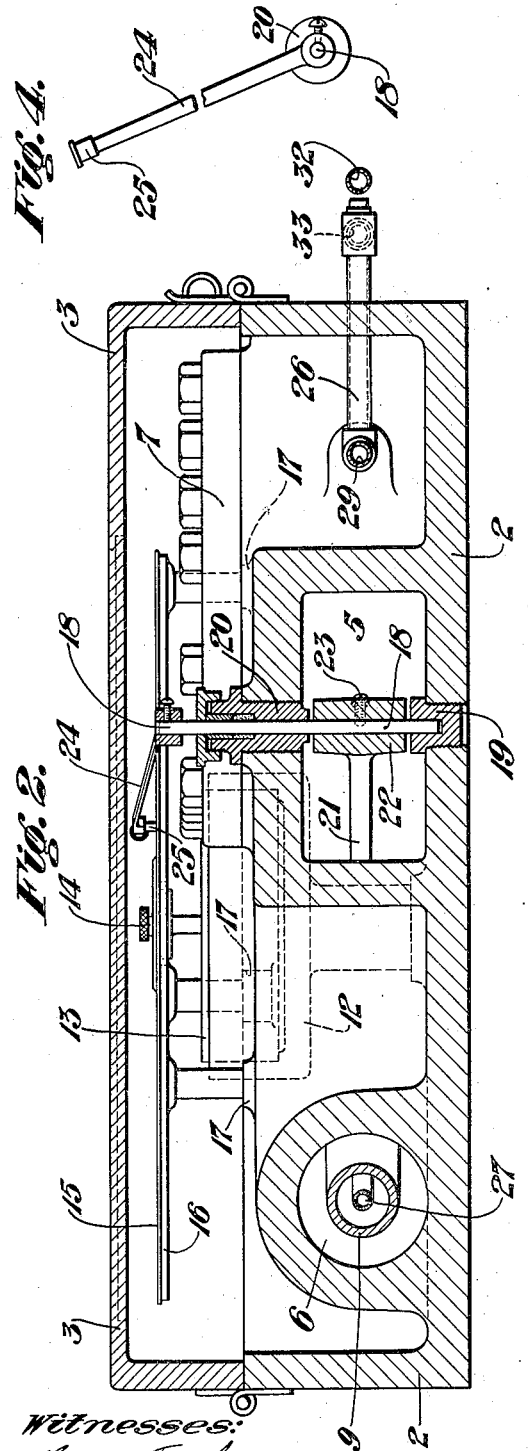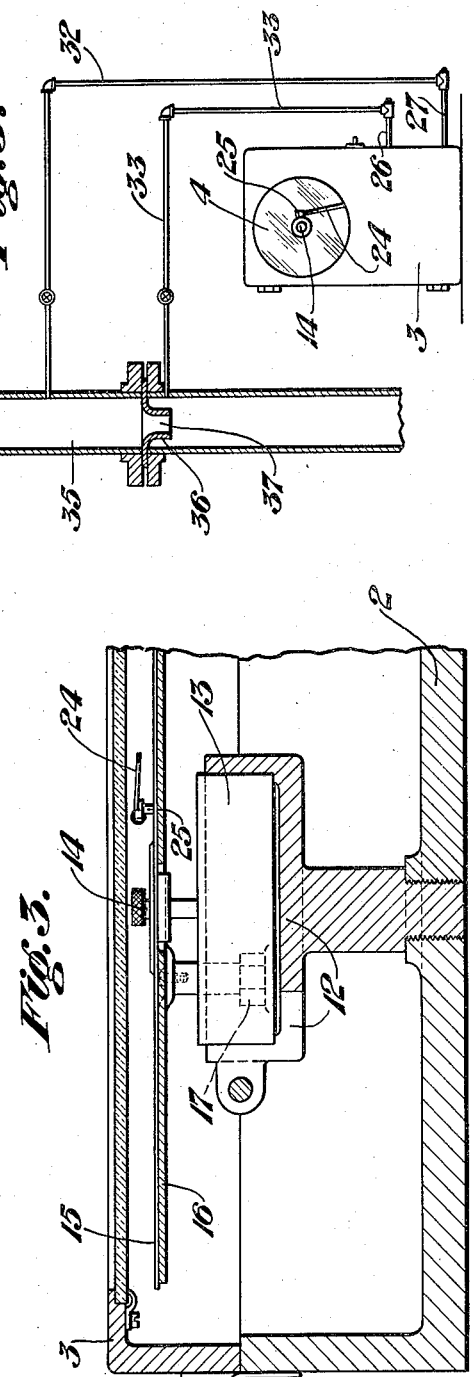

1,471,814

UNITED STATES PATENT OFFICE.

GEORGE L. WELLER, OF ELYRIA, OHIO.

METER.

Application filed May 4, 1922. Serial No. 558,545.

*To all whom it may concern:*

Be it known that I, GEORGE L. WELLER, a citizen of the United States, and resident of Elyria, in the county of Lorain and State of Ohio, have invented certain new and useful Improvements in Meters, of which the following is a specification.

This invention relates to metering devices and more particularly to a flow meter for measuring the flow of fluids, and has for one of its objects the provision of a metering device of this class with a minimum of moving parts, and one without gears, pinions, segments, cams, or other complicated parts liable to get out of adjustment.

Another object is to provide a metering device of the class described and that will operate on a very low differential without the usual hollow floats.

A further object is to provide a metering device that may be made in compact form, and one that may be adapted to measure the flow of various fluids.

A still further object is to provide a metering device having the novel design, construction, and combination of parts described in the following specification and illustrated in the accompanying drawings.

In the drawings, Figure 1 is an elevation of the meter partly broken away to show the internal mechanism.

Figure 2 is a sectional plan on the line II—II of Figure 1.

Figure 3 is a sectional plan on the line III—III of Figure 1.

Figure 4 is a plan view of the pen arm.

Figure 5 is a diagrammatic sectional elevation of a fluid main having my meter attached thereto.

Referring particularly to the drawings, the numeral 2 designates the meter casing which is closed by a hinged side member or cover 3 provided with a dial opening having a transparent plate 4 therein, which is preferably composed of glass, although other transparent materials may be used.

The casing 2 is preferably formed of cast metal and has a substantially triangular shaped low pressure chamber 5 and a curved mercury chamber 6 formed integral therewith, the mercury chamber having its upper end opening into the upper end of the low pressure chamber. The low pressure chamber has an opening in its front wall adjacent one side which is provided with a removable closure or hand plate 7 so as to facilitate assembling and repairing the meter mechanism. The mercury chamber 6 is curved on a true arc and is partially filled with mercury 8.

A high pressure float tube 9 is mounted in the mercury chamber 6 and has its lower end 10 open and its upper end 11 closed, the lower end being immersed or sealed in the mercury 8. The tube 9 is curved on the same arc as the curved mercury chamber 6 so as to permit it to ride freely therein and is internally tapered toward its open or lower end while its outside diameter is the same throughout its length so as to produce a correct record of flow on a chart having evenly spaced divisions, through mechanism to be described.

A clock holder 12 is mounted in the casing 2 and is adapted to have a Chelsea or other well known clock movement 13 removably mounted therein. The clock 13 is provided with a chart supporting arm 14 adapted to have a chart 15 removably secured thereto. A metal chart disk or plate 16 is mounted on lugs 17 on the base portion of the casing 2 and is apertured to permit the clock chart supporting arm to project therethrough, so that the chart is carried in front of the plate 16, said plate serving as a support or backing for the chart.

A spindle 18 is journaled in suitable bearings 19 and 20 in the back wall of the casing 2 and the opposite wall of the low pressure chamber 5, respectively. A lever 21 has one end secured to the closed end of the float tube 9 and its other end provided with a head 22 which is mounted on the spindle 18 and locked against rotation on the spindle by means of a set screw 23. As the high pressure float tube moves into or out of the mercury chamber the lever 21 will be rocked, thus rotating the spindle 18.

A pen arm 24 is removably secured to the upper end of the spindle 18 and carries a pen 25 on its free end adapted to engage the chart 15 and record any movement of the spindle thereon.

A low pressure pipe 26 leads into the low pressure chamber 5 and a high pressure pipe 27 passes through a stuffing box 28 in the end of the mercury chamber 6 and extends up into the float tube 9 to a point adjacent the closed upper end of the tube, when the tube is in its lowest position. The pipe 27 is curved within the chamber 6 on the same circular arc as the chamber and float tube, so that the tube will freely pass within the pipe.

The pipes 26 and 27 are connected by a by-pass pipe 29 controlled by a valve 30.

A suitable blow-out pipe 31 is connected with the low pressure chamber and extends outwardly through the casing 2.

Suitable pipes 32 and 33 lead from high and low pressure zones or areas in a main, and are connected with the pipes 27 and 26 respectively.

In Figure 5 I have shown diagrammatically one application of my meter to a gas main. In this figure the numeral 35 indicates the main which has a restrictor 36 therein forming a restricted opening or orifice 37 through which the fluids carried by the main must pass, and, therefore, forming a high pressure zone or area before said restrictor and a low pressure area immediately beyond said restrictor.

The pilot pipes 32 and 33 lead from the high and low pressure areas, respectively, to the high pressure float tube and to the low pressure chamber of the meter.

The detailed operation of the meter is as follows: Assuming that the meter is connected to a main as shown in Figure 5, that the by-pass valve 30 is closed and that fluid is flowing through the main and into the pilot pipes 32 and 33. The low pressure chamber 5 and high pressure tube 9 will fill with the fluids, respectively, from the low pressure and high pressure areas of the main, thus forcing out the tube 9 into the chamber 5, due to the difference in pressure of the fluids in the tube 9 and chamber 5. The movement of the tube 9 will rock the lever 21 and rotate the spindle 20, thus operating the pen arm 24 and pen 25 to record the movement on the chart 15.

As the flow pressure in the main 35 changes, the difference in the pressures in the tube 9 and the chamber 5 will cause the tube to move into and out of the chamber 5, thus rocking the lever 21 and rotating the spindle 20, and operating the pen 25 to record the movements of the tube on the chart 15. This movement of the pen on the chart, which chart is being continually rotated by the clock 13, gives a continuous diagram of differential pressures. So that the operator knowing the differential pressures with the aid of constants, can readily determine the volume of flow.

The primary reason for making the tube 9 tapered internally is to produce a correct record of flow on a chart having evenly spaced divisions. As the tube 9 rises out of the mercury, due to the increase of differential pressure, the effective area of the tube is diminished and instead of an increase in movement of the pen 25 for proportionate increase of pressure, it remains constant throughout the range of the chart.

While I have shown only one preferred form of my invention, various modifications may be made without departing from the spirit and scope of my invention as defined in the appended claims.

I claim—

1. A metering device comprising a casing having a low pressure chamber and a mercury chamber formed therein, said mercury chamber being arcuate shaped and having one end opening into said low pressure chamber, mercury in said mercury chamber, an arcuate shaped high pressure float tube mounted in said mercury chamber and having one end open and immersed in said mercury, said high pressure float tube being adapted to move into and out of said low pressure chamber according to the differential in pressure between the fluids in said low pressure chamber and the fluids in said high pressure float tube, a chart mounted in said casing, a spindle journaled in said casing, a lever fixedly secured to said high pressure float tube and to said spindle and adapted to rotate said spindle, and a pen secured to said spindle and adapted to record the movements of said float tube on said chart.

2. A metering device comprising a casing having a low pressure chamber and a mercury chamber formed therein, said mercury chamber being arcuate shaped and having one end opening into said low pressure chamber, mercury in said mercury chamber, an arcuate shaped high pressure float tube mounted in said mercury chamber and having one end open and immersed in said mercury, said high pressure float tube being adapted to move into and out of said low pressure chamber according to the differential in pressure between the fluids in said low pressure chamber and the fluids in said high pressure float tube, a clock removably mounted in said casing, a chart mounted on said clock and adapted to be rotated thereby, a spindle journaled in said casing, a rigid lever fixedly secured to the closed end of said float tube and to said spindle and adapted to rotate said spindle, and a pen secured to said spindle and adapted to record the movements of said float tube on said chart.

3. A metering device comprising a casing having a low pressure chamber and mercury chamber formed therein, said mercury chamber being arcuate shaped and having its upper end opening into said low pressure chamber, mercury within said mercury chamber, an arcuate shaped high pressure float tube mounted in said mercury chamber, said tube tapering internally toward its lower end and having its lower end open and its upper end closed, said tube being adapted to move through the upper open end of said mercury chamber into and out of said low pressure chamber according to the differential in pressure between the fluid in said low pressure chamber and the fluid in said tube, a clock removably mounted in said casing, a chart mounted on said clock and adapted to be rotated thereby, a spindle journaled in said casing, a rigid lever fixedly secured to the closed end of said tube and said spindle and adapted to rotate said spindle when said tube is moved, and a pen secured to said spindle and adapted to record the movements of said tube on said chart.

4. The combination with a fluid main having a restricted orifice therein so as to form a high pressure area before said orifice and a low pressure area beyond said orifice, of a flow meter, said meter comprising a casing having a low pressure chamber and a mercury chamber formed therein, said mercury chamber being arcuate shaped and having one end opening into said low pressure chamber, mercury in said mercury chamber, an arcuate shaped high pressure float tube mounted in said mercury chamber and having one end open and immersed in said mercury, a pipe leading from the high pressure area of said main into said high pressure float tube, a second pipe leading from the low pressure area of said main into said low pressure chamber, said high pressure float tube being adapted to move into and out of said low pressure chamber according to the differential in pressure between the fluid in said low pressure chamber and the fluid in said high pressure float tube, a clock mounted in said casing, a chart mounted on said clock and adapted to be rotated thereby, a spindle journaled in said casing, a lever fixedly secured to the closed end of said float tube and to said spindle, and adapted to rotate said spindle as said float tube is moved, a pen arm secured to said spindle and projecting over said chart, and a pen carried by said pen arm and adapted to record the movements of said float tube on said chart.

In testimony whereof I have hereunto set my hand.

GEORGE L. WELLER.